United States Patent [19]

Mumcu

[11] 4,349,661
[45] Sep. 14, 1982

[54] PREPARATION OF POLYETHER ESTER AMIDES

[75] Inventor: Salih Mumcu, Marl, Fed. Rep. of Germany

[73] Assignee: Chemische Werke Hüls AG, Marl, Fed. Rep. of Germany

[21] Appl. No.: 180,618

[22] Filed: Aug. 25, 1980

[30] Foreign Application Priority Data

Sep. 13, 1979 [DE] Fed. Rep. of Germany ....... 2936976

[51] Int. Cl.$^3$ ...................... C08G 69/41; C08G 63/42
[52] U.S. Cl. .................................... 528/288; 525/296; 525/419; 528/292; 528/318
[58] Field of Search ............... 528/318, 323, 326, 288, 528/292, 289; 525/419, 926

[56] References Cited

U.S. PATENT DOCUMENTS

| | | | |
|---|---|---|---|
| 2,401,607 | 6/1946 | Bruson | 260/464 |
| 3,428,710 | 2/1969 | Daumiller et al. | |
| 3,489,816 | 1/1970 | Hornig et al. | |
| 3,838,076 | 9/1974 | Moss et al. | |
| 3,847,992 | 11/1974 | Moss | |
| 3,944,629 | 3/1976 | Hendrick | |
| 3,993,709 | 11/1976 | Hendrick et al. | |
| 4,182,843 | 1/1980 | Haupt et al. | 528/326 |
| 4,207,410 | 6/1980 | Burzin et al. | 528/288 |
| 4,252,920 | 2/1981 | Deleens et al. | 525/926 |

FOREIGN PATENT DOCUMENTS

| | | |
|---|---|---|
| 2135770 | 1/1972 | Fed. Rep. of Germany . |
| 2658714 | 7/1977 | Fed. Rep. of Germany . |
| 897624 | 5/1962 | United Kingdom ............... 528/318 |
| 1211118 | 11/1970 | United Kingdom . |
| 1473972 | 5/1977 | United Kingdom . |

OTHER PUBLICATIONS

"Encyclopedia of Chemical Technology" Kirk-Othmer 2nd Ed., vol. 16, pp. 88–105, 1969.

*Primary Examiner*—Theodore Morris
*Attorney, Agent, or Firm*—Wells & Wells

[57] ABSTRACT

The process for preparing thermoplastic polyether amides or polyether ester amides from lactams, dicarboxylic acids and polyethers having hydroxyl end groups and amino end groups or polyethers having amine end groups is improved.

First, a mixture of lactams having at least 8 C atoms with dicarboxylic acids is melted in a molar ratio of 100/7 to 100/120 at temperatures of 230° to 300° C. while being mechanically mixed, in an inert gas atmosphere at ordinary pressure and in the absence of water, until the lactams have been reacted to at least 99%. Then, the polyether bearing the hydroxyl end groups and/or the amino end groups is added in a molar ratio of 1/0.95 to 1/1.05, based on the amount of dicarboxylic acid contained in the molten mixture. Homogenizing is then carried out with further mixing at 230° to 290° C. Lastly, a polycondensation is carried out to completion at 250° to 290° C.

10 Claims, No Drawings

PREPARATION OF POLYETHER ESTER AMIDES

CROSS REFERENCE TO RELATED APPLICATIONS

Applicant claims priority under 35 USC 119 for application No. P 29 36 976.4, filed Sept. 13, 1979 in the Patent Office of the Federal Republic of Germany.

The disclosure of copending U.S. Pat. application Ser. No. 169,111, filed July 10, 1980 of Salih Mumcu et al, entitled "Method for the Preparation of Polyether Ester Amides," is incorporated herein. This copending application discloses a method for manufacturing polyether ester amides by polycondensing at ordinary or reduced pressure, optionally in the presence of catalysts:

(a) polyamides having carboxyl end groups with polyethers having hydroxyl end groups and amino end groups;

(b) polyamides having carboxyl end groups with polyethers having amino end groups; or (c) polyamides having amino end groups with polyethers having carboxyl end groups; and prior to polycondensing the end group bearing polyamides and end group bearing polyethers are treated at temperatures from about 200° to 300° C. and at a water vapor pressure of about 5 to 25 bars with mechanical agitation and after water is removed by decompression the polycondensation is carried out.

BACKGROUND OF THE INVENTION

The field of the invention is polyether ester amides.

The state of the art of preparing polyether ester amides may be ascertained by reference to British Pat. Nos. 1,211,118 and 1,473,972; West German Published Application No. 2,658,714 and U.S. Pat. Nos. 3,428,710; 3,489,816; 3,944,629; 3,993,709; and 4,207,410, the disclosures of which are incorporated herein.

Polyamide plastics, additives useful therein, their properties and methods of processing, machining and finishing are disclosed in Kirk-Othmer, "Encyclopedia of Chemical Technology," 2nd Ed. (1968) Vol. 16, pp. 88–105, the disclosure of which is incorporated herein.

The preparation of polyether ester amides, also referred to as block polyamide polyether esters, is known.

The following procedures are manufacturing processes of the prior art; the polycondensation of a polyamide forming monomer, for instance lactams, omega-aminocarboxylic acids, or equivalent amounts of dicarboxylic acids and diamines with a polyether having end located amino groups in the presence of dicarboxylic acids or with a polyether having end located carboxyl groups in the presence of diamines; and polycondensation of a polyether with polyamide oligomers including either carboxyl end groups or amine end groups. These prior art processes are disclosed in West German Published Application No. 2,658,714; British Pat. Nos. 1,211,118 and 1,473,972 and U.S. Pat. Nos. 3,428,710; 3,489,816 and 4,207,410.

It is known that polyethers and polyamides are mutually incompatible. Due to the heterogeneity of the reaction components, polycondensation takes place very slowly. Furthermore, only molded materials having a high extract content and relatively low molecular weights are obtained, so that inadequate stability is incurred in the molded articles made by injection molding and especially by the extrusion process.

The U.S. patent application of Mumcu et al, filed July 10, 1980 and having Ser. No. 169,111 discloses a process which starts from polyamides bearing end groups and from polyethers bearing end groups, wherein, with the introduction of a pressurized stage under water vapor pressure, homogenization is achieved and hence polyether ester amides of high molecular weight are obtained in shorter reaction times and these polyether ester amides are advantageously processed into molded bodies.

U.S. Pat. No. 4,207,410 also discloses a process which starts with the monomeric polyamide forming compounds, dicarboxylic acids and polyether glycols while using pressure in the presence of water, to achieve polyether ester amides of high molecular weights.

It is furthermore known to prepare polyether ester amides in the absence of gauge pressure. The lactam rings are opened in the presence of dicarboxylic acids and diol or oligo-ether diols or oligo-ether-esters, as disclosed in the published text of German patent application No. P 11 24, 39 c-10; West German Published Application No. 21 35 770, in the example, and East German Patent 87,888. The products obtained according to this method, however, contain excessive amounts of unconverted lactam monomer despite a long condensation time of up to 24 hours. Their molecular masses are so low that they are not suitable for preparing extrusion molded articles.

SUMMARY OF THE INVENTION

Having in mind the limitations of the prior art, it is an object of the present invention to create a process which averts the application of pressure and nevertheless permits the manufacture of high molecular-weight, thermoplastic polyether amides or polyether ester amides with reduced times of reaction.

This object is achieved by:

(a) first melting a mixture of lactams having at least 8 C atoms and dicarboxylic acids in a molar ratio of 100/7 to 100/120 in an inert atmosphere at atmospheric pressure in the absence of water and at temperatures from about 250° to 300° C. while being mechanically mixed, until the lactams are at least reacted 99%;

(b) adding polyethers having amino end groups or polyethers having hydroxyl end groups and amino end groups to (a) in a molar ratio from 1/0.95 to 1/1.05 to the dicarboxylic acids of (a);

(c) homogenizing the mixture of (b) with mechanical mixing at about 230° to 290° C.; and (d) carrying out a polycondensation of (c) at a temperature of about 250° to 290° C.

DESCRIPTION OF PREFERRED EMBODIMENTS

Accordingly, only when a specific sequence and definite mixing ratios relating thereto are observed, and specific higher lactams are selected, is success obtained. Accordingly, hydrolytic polymerization in the presence of water and under pressure is averted. Surprisingly, it is possible to open the rings of the higher member lactams rapidly and completely enough in the absence of water, and in the presence only of dicarboxylic acids.

The stage designated hereafter as the acidolytic opening of the lactams is accelerated in conventional manner using catalysts. Suitable catalysts are phosphoric acid and its amine salts, zinc acetate and calcium acetate in proportions of 0.01 to 0.3% by weight referred to all reagents, Phosphoric acids in proportions of 0.02 to 0.1% by weight are preferred. These small amounts cause no degradation of the stability regarding hydrolysis. The proportion of catalyst is the lower, the less the molar ratio lactam/dicarboxylic acid.

Advantageously the molar ratio of lactams/dicarboxylic acids is 100/10 to 100/60 and preferably 100/15 to 100/30.

Suitable lactams having at least 8 C atoms are capryllactam, lauryl lactam or their mixtures. Lauryl lactam preferably is used. Suitable dicarboxylic acids are linear aliphatic dicarboxylic acids having the general formula $HOOC-(CH_2)_x-COOH$, where x is a value between 4 and 11, and/or is a branched aliphatic dicarboxylic acid. The following are illustratively applicable: adipic acid, tetramethyl adipic acid, pimelic acid, suberic acid, azelaic acid, sebacic acid and decanedicarboxylic acid. Furthermore, cycloaliphatic and/or aromatic dicarboxylic acids having at least 8 C atoms such as hexahydroterephthalic acid, terephthalic acid, isophthalic acid, phthalic acid or naphthalene dicarboxylic acid are useful. Decane dicarboxylic acid and isophthalic acid are preferred.

Suitable polyethers are derived from ethylene oxide, propylene oxide and tetrahydrofuran. The polyethers can be homopolymers and/or copolymers. Mixtures of homopolymers and copolymers also may be used. The mean numerical molecular masses of the polyethers are between 160 and 3000, preferably between 300 and 2200, especially between 500 and 1200. They contain OH and/or $NH_2$ groups as end groups. Polytetrahydrofuran having $NH_2$ end groups is preferredly used. The preparation of polyethers with $NH_2$ end groups can be carried out by known methods, for instance, West German Published Application No. 15 70 542 and U.S. Pat. Nos. 3,838,076; 3,847,992; and 2,401,607.

The preparation of the polyether amides of polyether ester amides appropriately takes place in an agitated vessel. The lactam rings are opened and polymerized in a $N_2$ atmosphere at 250° to 290° C. in the presence of the dicarboxylic acids. To ensure more reliable exclusion of air, the procedure is carried out at $N_2$ gauge pressures up to 0.5 bars. It takes a maximum of 5 hours to open the rings. When phosphoric acid is present, 15 minutes to 2 hours will suffice. In that time, the reaction of the lactam monomers is completed to about 99.0 to 99.7%.

The polyethers are added preferably in equimolar proportions to the dicarboxylic acid content contained in the reaction product of lactams and dicarboxylic acids, at temperatures between 230° and 290° C., and the mixture is homogenized for ½ to 2 hours.

Thereupon the polycondensation is carried out to completion with stirring, at 250° to 290° C., preferably between 260° and 280° C., at ordinary pressure, with $N_2$ being made to pass over the mixture, or the polycondensation is carried out in a vacuum between 100 and 1 mbars, preferably 90 to 5 mbars.

The desired relative solution viscosities of the polyether amides and polyether ester amides are between about 1.4 and 2.4, preferably between 1.6 and 2.2, measured according to German Industrial Standard DIN 53 727 in m-cresol at 25° C.

Polyether amides and polyether ester amides may contain additives such as stabilizers against light and thermo-oxidizing degradation, flame-proof agents, dyestuffs, pigments, softeners, processing accessories and fillers, such as diclosed in Kirk-Othmer, ibid., pp. 92-95, which are added before, during or after the polycondensation.

The polymer products of the present invention may be processed as disclosed in Kirk-Othmer, ibid., pp. 98-103.

As regards color and properties, the polyether amides and polyether ester amides correspond to products already being prepared by opening the rings in hydrolytic manner. They are suitable for the manufacture of molded articles of high impact strength at low temperatures, such as pipes, films and foils made by the injection molding or extrusion methods.

The invention is discussed below in detail with relation to illustrative specific embodiments:

The lactam contents are ascertained by gas chromatography.

The molecular masses indicated are mean numerical molecular masses.

COMPARATIVE EXAMPLE 1 (corresponding to West German Published Application 21 35 770

19.7 kg of lauryl lactam (100 moles); 11.14 kg of polyetherester from 1.46 kg of adipic acid (10 moles); 10 kg of polyethylene glycol with a molecular mass of 1,000 (10 moles) and 30 g of phosphoric acid are heated for 15 hours to 280° C. in a 50 liter reactor. Then $N_2$ is passed at 260° C. for 5 hours at the rate of 200 liters/hour and a vacuum of 1 mbar is applied for 6 hours. Of the lauryl lactam starting material, 9% is recovered. The brown and brittle material obtained has relative viscosity value of 1.45.

EXAMPLE 1

19.7 kg of lauryl lactam (100 moles); 1.46 kg of adipic acid (10 moles) and 30 g of phosphoric acid are heated to 280° C. for 3 hours in a 50 liter vessel, 10 kg of polyethylene glycol of molecular mass 1,000 is added and mixed for 1 hour. $N_2$ is made to pass at 200 liters/hour and 260° C. for 5 hours, and a vacuum of 1 mbar is applied for 6 hours. No lauryl lactam is recovered. The yellow material so obtained is not brittle. It has a relative viscosity value of 1.65 and a lauryl lactam content of 0.1% by weight.

EXAMPLE 2

19.7 kg of lauryl lactam (100 moles) and 3.45 kg of decane dicarboxylic acid (15 moles) are heated to 280° C. for 2 hours in a 100 liter agitated vessel under a $N_2$ atmosphere, whereupon 15.5 kg of alpha, omega-dihydroxy-(polytetrahydrofuran) of molecular mass 1,000 (15.5 moles) is added, with mixing for one hour. $N_2$ is made to pass at 200 liters/hour and 270° C. for 5 hours and a vacuum of 90 mbars is applied for 8 hours. The highly flexible product so obtained has a lactam content of 0.03% by weight and a relative viscosity value of 1.7.

EXAMPLE 3

19.7 kg of lauryl lactam (100 moles) and 5.75 kg of decane dicarboxylic acid (25 moles) are heated for 2 hours to 280° C. in a nitrogen atmosphere in a 100 liter agitated vessel (the prepolymer obtained contains 0.4% by weight of lauryl lactam). 26 kg of alpha, omega-dihydroxy-(polytetrahydrofuran) with molecular mass of 1,000 (26 moles) and 15.4 g of phosphoric acid are added and stirred for one hour. Polycondensation first takes place at 270° C. for 5 hours with $N_2$ being made to pass, then within 8 hours at a vacuum of 90 mbars. The product so obtained has a relative viscosity value of 2.1.

EXAMPLE 4

The procedure is the same as in Example 3, however, the ring-opening takes place in the presence of 7.7 g of phosphoric acid within one hour. The polymer so obtained has a relative viscosity value of 2.1. It contains 0.02% by weight of lauryl lactam.

EXAMPLE 5

14.1 kg of capryllactam (100 moles) and 2.49 kg of isophthalic acid (15 moles) are heated to 280° C. for 4 hours in an atmosphere of nitrogen in a 50 ml agitating vessel. (The prepolymer obtained contains 0.28% by weight of capryllactam). 15.5 kg of alpha, omega-dihydroxy-(polytetrahydrofuran) of molecular mass 1000 (15 moles) are added and stirred for one hour. $N_2$ at a rate of 100 liters/hour is passed for 5 hours at 270° C. and a vacuum of 90 mbar, is applied for 8 hours. The colorless polymer obtained has a relative viscosity of 1.73.

EXAMPLE 6

The procedure is the same as in Example 5, however, ring-opening is carried out within 4 hours at 250° C. (the lactam content of the prepolymer is 0.38% by weight). The polyether ester amide has the same relative viscosity of 2.1.

EXAMPLE 7

7.05 kg of capryllactam (50 moles); 9.85 kg of lauryl lactam (50 moles); 7.53 kg of azelaic acid (40 moles) and 32 g of phosphoric acid are heated for 40 minutes to 280° C. in a 100 liter agitated vessel in a $N_2$ atmosphere (the prepolymer obtained contains 0.22% by weight of lauryl lactam and 0.14% by weight of capryllactam). 26.5 kg of alpha,omega-dihydroxy-(polytetrahydrofuran) of molecular mass 650 (40.8 moles) are added and stirred for one hour. $N_2$ is made to pass over for two hours at 270° C. and then a vacuum of 20 mbars is applied for 7 hours.

The relative viscosity of the polymer obtained is 1.92.

EXAMPLE 8

19.7 kg of lauryl lactam (100 moles) and 4.6 kg of decane dicarboxylic acid (20 moles) are heated for 90 minutes to 280° C. in a 100 liter agitated vessel in an $N_2$ atmosphere (the prepolymer obtained has a lactam content of 0.38% by weight). 22 kg of polytetrahydrofuran diamine of molecular mass 1,100 (20 moles) are added and stirred for 30 minutes into the mixture, and the temperature is lowered to 265° C. while this is done. Subsequently, the substance of reaction is polycondensed for 5 hours while $N_2$ is made to pass over at 200 liters/hour. The relative viscosity value of the polyetheramide obtained is 1.95.

EXAMPLE 9

10.575 kg of capryllactam (75 moles) and 6.9 kg of decane dicarboxylic acid (30 moles) are heated to 280° C. for one hour in a 100 liter agitated vessel in a $N_2$ atmosphere (the prepolymer has a capryllactam content of 0.18% by weight). 33 kg of polytetrahydrofuran diamine with a molecular mass of 1,100 (30 moles) are added and stirred into the mixture for 20 minutes. The substance of reaction is polycondensed for 6 hours at 270° C. while passing $N_2$ at 200 liters/hour. The relative viscosity of the polyether amide obtained is 1.90.

I claim:

1. In a method for preparing thermoplastic polyether amides or polyether ester amides from lactams, dicarboxylic acids and polyethers having hydroxyl end groups and amino end groups or polyethers having amino end groups, the improvement comprising:
   (a) melting a mixture of said lactams having at least 8 C atoms and said dicarboxylic acids in a molar ratio of 100/7 to 100/120 at temperatures of about 230° to 300° C. while being mechanically mixed, in an inert gas atmosphere at atmospheric pressure in the absence of water for sufficient time to react said lactams to at least 99%;
   (b) adding said polyethers to (a) in a molar ratio of 1/0.95 to 1/1.05 to said dicarboxylic acids of (a);
   (c) homogenizing (b) with further mixing at about 230° to 290° C.; and
   (d) carrying out a polycondensation of (c) at about 240° to 290° C.

2. The method of claim 1, wherein said lactams and said dicarboxylic acids are used in molar ratios of 100/10 to 100/60.

3. The method of claim 1, wherein said lactams and said dicarboxylic acids are used in molar ratios of 100/15 to 100/30.

4. The method of claim 1, wherein lauryl lactam is said lactam and alpha, omega-dihydroxy(polytetrahydrofuran) is said hydroxyl end group bearing polyether.

5. The method of claim 2, wherein lauryl lactam is said lactam and alpha, omega-dihydroxy(polytetrahydrofuran) is said hydroxyl end-group bearing polyether.

6. The method of claim 3, wherein lauryl lactam is said lactam and alpha, omega-dihydroxy(polytetrahydrofuran) is said hydroxyl end-group bearing polyether.

7. Articles of high impact strength at low temperatures molded from the thermoplastic polyether amides and polyether ester amides of claim 1.

8. The method of claim 1, further comprising in step (a) a catalyst selected from the group consisting of phosphoric acid, amine salts of phosphoric acid, zinc acetate and calcium acetate in amounts of about 0.01 to 0.3% by weight.

9. The method of claim 8, wherein said catalyst is phosphoric acid in amounts of about 0.02 to 0.1% by weight.

10. The method of claim 1, wherein said polyether amides or polyether ester amides of step (d) have a relative solution viscosity of about 1.4 to 2.4 as measured in m-cresol at 25° C. according to German Industrial Standard 53 727.

* * * * *

UNITED STATES PATENT OFFICE
CERTIFICATE OF CORRECTION

Patent No. 4,349,661  Dated September 14, 1982

Inventor(s) Salih Mumcu

It is certified that error appears in the above-identified patent and that said Letters Patent are hereby corrected as shown below:

Column 3, line 31, "$NH_2$" should be "OH";

Column 6, line 14, after "groups" add - - - or polyethers having hydroxyl end groups - - -.

Signed and Sealed this

Twelfth Day of April 1983

[SEAL]

Attest:

Attesting Officer

GERALD J. MOSSINGHOFF
Commissioner of Patents and Trademarks